United States Patent
Havard et al.

(10) Patent No.: US 8,779,698 B2
(45) Date of Patent: Jul. 15, 2014

(54) AUTOMATIC VARIABLE SPEED MOTOR DRIVE BYPASS

(75) Inventors: Harold Gene Havard, Terrell, TX (US); Der-Kai Hung, Dallas, TX (US); Stephen A. Walter, Flower Mound, TX (US)

(73) Assignee: Lennox Industries Inc., Richardson, TX (US)

( * ) Notice: Subject to any disclaimer, the term of this patent is extended or adjusted under 35 U.S.C. 154(b) by 215 days.

(21) Appl. No.: 13/332,778

(22) Filed: Dec. 21, 2011

(65) Prior Publication Data

US 2013/0087319 A1    Apr. 11, 2013

Related U.S. Application Data

(60) Provisional application No. 61/543,709, filed on Oct. 5, 2011.

(51) Int. Cl.
*H02K 7/14* (2006.01)
*H02P 3/00* (2006.01)

(52) U.S. Cl.
USPC ............ 318/3; 318/470; 318/471; 318/472; 318/400.34

(58) Field of Classification Search
USPC ........... 318/3, 400.34, 503, 471, 472; 361/23; 700/300; 62/115
See application file for complete search history.

(56) References Cited

U.S. PATENT DOCUMENTS

| | | | |
|---|---|---|---|
| 3,939,456 A * | 2/1976 | Curtis et al. | 340/519 |
| 4,192,268 A * | 3/1980 | Hattori et al. | 123/700 |
| 4,285,319 A * | 8/1981 | Hattori et al. | 123/682 |
| 5,898,239 A | 4/1999 | Kawam | |
| 6,227,961 B1 * | 5/2001 | Moore et al. | 454/229 |
| 6,316,896 B1 | 11/2001 | Tikkanen et al. | |
| 6,670,722 B1 * | 12/2003 | Kessell et al. | 307/9.1 |
| 7,246,500 B2 | 7/2007 | Singh et al. | |
| 7,353,765 B1 * | 4/2008 | Feldman et al. | 114/211 |
| 7,558,031 B2 * | 7/2009 | Boren | 361/23 |
| 7,598,628 B2 | 10/2009 | Zver et al. | |
| 7,617,019 B2 * | 11/2009 | Leuschner | 700/300 |
| 7,800,339 B2 | 9/2010 | Gonzalez et al. | |
| 7,845,183 B2 | 12/2010 | Singh et al. | |
| 7,948,721 B2 | 5/2011 | Brunner et al. | |
| 2002/0121556 A1 * | 9/2002 | Pouchak | 237/7 |
| 2002/0193890 A1 * | 12/2002 | Pouchak | 700/21 |
| 2004/0075342 A1 * | 4/2004 | Feldman et al. | 307/10.1 |
| 2004/0252423 A1 * | 12/2004 | Boren | 361/23 |
| 2005/0035664 A1 | 2/2005 | Zver et al. | |
| 2005/0247438 A1 * | 11/2005 | Leuschner | 165/127 |

(Continued)

OTHER PUBLICATIONS

Emerson Industrial Automation, Control Techniques; Electronic Bypass for Affinity and Commander HSK Drives; www.hvacr-dries.com; 2010; 2 pages.

(Continued)

*Primary Examiner* — Paul Ip (57) ABSTRACT

An HVAC system includes a blower motor and a variable speed motor drive. The variable speed motor drive is configured to receive line power and provide modulated power to the motor. The blower motor is configured to produce airflow in response to the modulated power. A unit controller is configured to bypass the variable speed motor drive to provide the line power directly to the blower motor in the event that a measured airflow is less than a predetermined value.

18 Claims, 6 Drawing Sheets

(56) References Cited

U.S. PATENT DOCUMENTS

| | | | |
|---|---|---|---|
| 2007/0289322 A1* | 12/2007 | Mathews | 62/225 |
| 2008/0116830 A1 | 5/2008 | Gonzalez et al. | |
| 2008/0315811 A1* | 12/2008 | Hudson et al. | 318/400.34 |
| 2009/0092502 A1* | 4/2009 | Marcinkiewicz | 417/63 |
| 2009/0167229 A1* | 7/2009 | Brunner et al. | 318/503 |
| 2009/0255278 A1* | 10/2009 | Taras et al. | 62/115 |
| 2010/0207565 A1 | 8/2010 | Leung et al. | |

OTHER PUBLICATIONS

Siemans Building Technologies, Inc.; VFD E-Bypass 101 The Basics; White Paper; 2004; www.sbt.Siemens.com/hvp/components; 2 pages.

Siemans Building Technologies, Inc.; SED2 Variable Frequency Drives Electronic Bypass (E-Bypass) Options; Apr. 20, 2007; pp. 1-7; Submittal Sheet Document No. 154-051.

Siemans Building Technologies, Inc.; SED2 VFD Electronic Bypass Option—Operating Instructions; 2003; 38 pages; item No. 125-3208, Rev. 012.

Cerus Industrial; P Series Variable Frequency Drive with Bypass—3 Contactor Equivalent—NEMA 4/12 Enclosure; Aug. 21, 2009; 7 pages.

Johnson Controls, Inc.; Variable Speed Drives—Power Up; 2009; 4 pages; Milwaukee, WI; PUBL-5119 (Rev. Sep. 2009).

Hitachi; HiPass Bypass System—Your Energy Cost Savings Solution; www.ctiautomation.net; Sep. 2004; 6 pages.

ABB Inc.; ABB HVAC E-Bypass and Disconnects—ACH550, 1-550 Hp Technical catalog; 2006; New Berlin, Wisconsin.

ABB Inc.; ABBHVAC Packaged Drive Systems—ABB E-Clipse Bypass; Sales Bulletin; 2005; 15 pages.

Honeywell International Inc.; SmartVFD HVAC and Bypass—The Smart Choice for Energy Savings; 8 pages; May 2010.

* cited by examiner

AUTOMATIC VARIABLE SPEED MOTOR DRIVE BYPASS

CROSS-REFERENCE TO RELATED APPLICATIONS

This application claims the benefit of U.S. Provisional Application Ser. No. 61/543,709, filed by Gene Havard, et al., on Oct. 5, 2011, entitled "Automatic Variable Frequency Drive Bypass," commonly assigned with this application and incorporated herein by reference.

TECHNICAL FIELD

This application is directed, in general, to heating, ventilating and air conditioning (HVAC) systems, and to methods of operating and manufacturing such systems.

BACKGROUND

Heating, ventilating and air conditioning systems sometimes use a variable frequency drive (VFD) to control the operation of a motor, such as a variable speed blower motor. The VFD modulates the frequency and voltage provided to the motor to modulate the power and speed of the motor. The VFD and the motor thus produce a controllable airflow that may be used to provide more precise conditioning of a conditioned space and/or power savings relative to similar systems employing a single-speed blower motor.

VFDs, like most electronic device, may fail after a period of normal operation. In an HVAC system such failure may result in loss of an HVAC service, e.g. heating or cooling. Thus, in some HVAC applications a bypass circuit may bypass the VFD to provide power to the blower motor to maintain the HVAC service until the VFD can be repaired or replaced.

SUMMARY

One aspect provides an HVAC system, including a blower motor and a variable speed motor drive. The variable speed motor drive is configured to receive line power and provide modulated power to the motor. The blower motor is configured to produce airflow in response to the modulated power. A unit controller is configured to bypass the variable speed motor drive to provide the line power directly to the blower motor in the event that a measured airflow is less than a predetermined value.

Another aspect provides an HVAC unit controller. The controller includes a processor configured to execute instructions stored by a program memory. The program memory defines a VFD bypass module. The bypass module is configured to control a contactor to bypass a variable speed motor drive in the event that the controller receives an airflow-proving signal indicating airflow produced by a motor powered by the variable speed motor drive is less than a predetermined value.

Yet another aspect provides a method of manufacturing an HVAC system. The method includes connecting first and second contactors to power inputs of a blower motor. An output of a variable speed motor drive is connected to the first contactor such that the first contactor is electrically connected between the variable speed motor drive and the blower motor. A unit controller is configured to control the first and second contactors to bypass the variable speed motor drive to provide the line power directly to the blower motor in the event that a measured airflow produced by the blower motor is less than a predetermined value.

BRIEF DESCRIPTION

Reference is now made to the following descriptions taken in conjunction with the accompanying drawings, in which.

DETAILED DESCRIPTION

Some conventional HVAC systems monitor the operation of the VFD and activate a bypass circuit when a VFD failure is detected. However, such failure detection typically only guards against VFD failures. The inventors have realized that broader protection of the HVAC service may be provided by monitoring airflow produced by the blower motor. Such airflow monitoring may be used to indirectly detect a failure of the VFD. Advantageously, however, airflow monitoring may also be used to detect other failures in the blower system, such as a motor failure or failure of a drive mechanism between the motor and a blower unit. Various embodiments herein described provide enhanced HVAC system performance monitoring that may distinguish between airflow failure modes and report such information to a system maintenance provider. The provider may use such information to maintain and repair the system more expediently and at lower cost.

Figure 1:
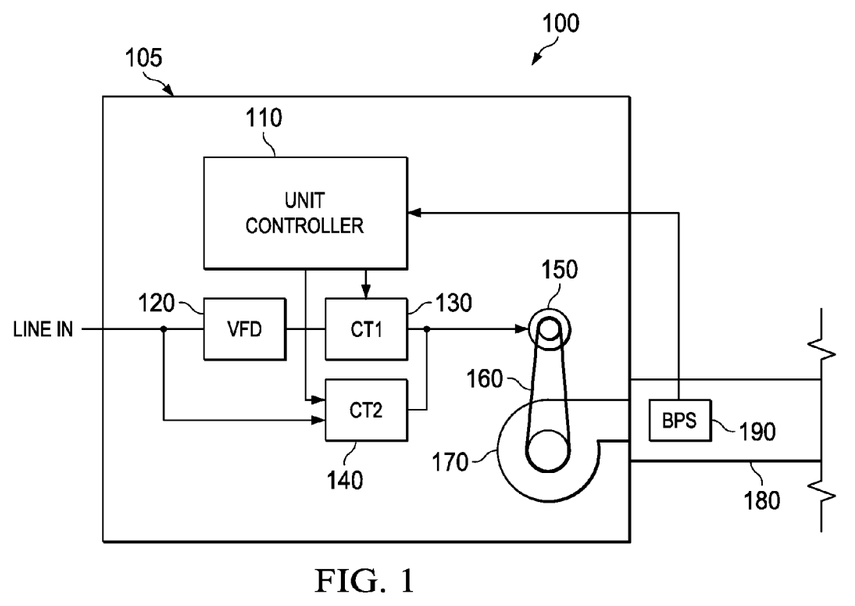
FIG. 1 illustrates an HVAC system, or unit, 100 according to one embodiment of the disclosure, including a unit controller 110 configured to control a variable speed motor contactor 130 and a bypass contactor 140 in response to a blower proving switch (BPS) 190.

FIG. 1 illustrates a system 100 according to one embodiment of the disclosure. The system 100 includes a chassis 105 that encloses a unit controller 110, a variable speed motor drive 120, first and second contactors 130 and 140, a motor 150, a belt 160, and a blower 170. The assembly of the motor 150, the belt 160 and the blower 170, as well as any pulleys and other blower drive train components may be referred to herein and in the claims as a blower system. The variable speed motor drive 120 may be, e.g. a variable frequency drive (VFD) or a variable voltage drive (VVD). While recognizing that embodiments of the invention may be advantageously practiced with either a VFD or a VVD, the discussion below refers for brevity to a VFD without limitation thereto. Accordingly, the variable speed motor drive 120 may be equivalently referred to as a VFD 120 without loss of generality.

The blower 170 is coupled to a duct 180. Within the duct 180 is located a blower proving switch (BPS) 190 configured to provide an airflow proving signal indicative of airflow produced by the blower 170. In other embodiments the BPS 190 is located within the chassis 105, e.g. within the blower 170. The controller 110 receives the proving signal and controls the contactors 130 and 140 in response thereto.

The system 100 may be, e.g. a portion of an HVAC system. The system 100 may be collocated with other HVAC components (not shown), including but not limited to a compressor, a heat exchanger, a filter, a furnace, a condenser or an evaporator. The system 100 may be a rooftop unit, but embodiments are not so limited. For example, the system 100 may be located in a ground-level HVAC installation. However, embodiments of the invention may be particularly useful in rooftop installations where location may make inspection and servicing difficult.

The unit controller 110, described further below, receives the airflow-proving signal and controls the contactors 130 and 140 in response thereto. In contrast to some conventional systems that directly monitor a VFD, the controller 110 need not receive a signal from the VFD. Thus, embodiments of the invention are advantageously not limited to using a VFD configured to provide operational feedback to a VFD controller. The BPS 190 provides the airflow-proving signal to the controller 110 that the blower 170 that is indicative of airflow. The airflow-proving signal may provide a continuous signal, e.g. a signal proportional to the airflow velocity, or a discontinuous signal, e.g. a signal that changes state in step fashion when the airflow drops below a predetermined setpoint.

During otherwise normal operation, when the airflow-proving signal indicates that the airflow has dropped below a threshold value, e.g. a predetermined value, the controller 110 may initiate a series of actions in response to the low airflow. The predetermined value may be a configurable parameter of the system 100, e.g. configurable by a service technician.

In some cases low or no airflow may indicate a failure of the VFD 120. The performance of the VFD 120 may degrade due to a gradual or sudden failure process. However, the airflow from the blower 170 may be interrupted by causes other than a VFD failure. For example, the belt 160 may break, bearings in the motor 150 or the blower 170 may seize, or debris may jam the pulley mechanism, resulting in a sudden and uncorrectable reduction of airflow. On the other hand, the performance of the VFD 120 may degrade due to a gradual or failure process.

In various embodiments the controller 110 is configured to perform steps of a method to determine if bypassing the VFD 120 may restore service, and if so to bypass the VFD 120. In cases for which the bypass restores service, the controller 110 may issue an alert with a relatively low priority to a maintenance provider. If instead the bypass fails to restore service, the controller 110 may issue an alert with a relatively higher priority to the maintenance provider. The alert may include information regarding the nature of the failure so that the maintenance provider is better prepared to correct the root cause of the failure.

The controller 110 in various embodiments is configured to determine if the root cause of the reduced airflow is correctable or not correctable. If the root cause is correctable, the controller 110 may take corrective action to ensure that the HVAC service associated with the system 100, e.g. heating and/or cooling, is not interrupted. Regardless of whether the reduced airflow is correctable or not, the controller 110 may initiated a process to alert an operator to the need for service.

The VFD 120 receives line power, e.g. 220V three-phase power. The VFD 120 supplies power to the motor 150 via the contactor 130. The power flow may be modulated by, e.g. changing the frequency of the power delivered to the motor 150. Line power may also bypass the VFD 120 via the contactor 140. Power delivered to the motor 150 via this path is unmodulated in the illustrated embodiment. The controller 110 may control the operation of the contactors 130, 140 such that power received by the motor 150 is modulated by the VFD 120 or bypasses the VFD 120. Thus, if the VFD 120 fails or degrades, or is otherwise to be serviced, operation of the motor 150 may continue uninterrupted. As described earlier, the VFD 120 may be replaced with another type of motor controller, e.g. a variable voltage controller.

Figure 2A:
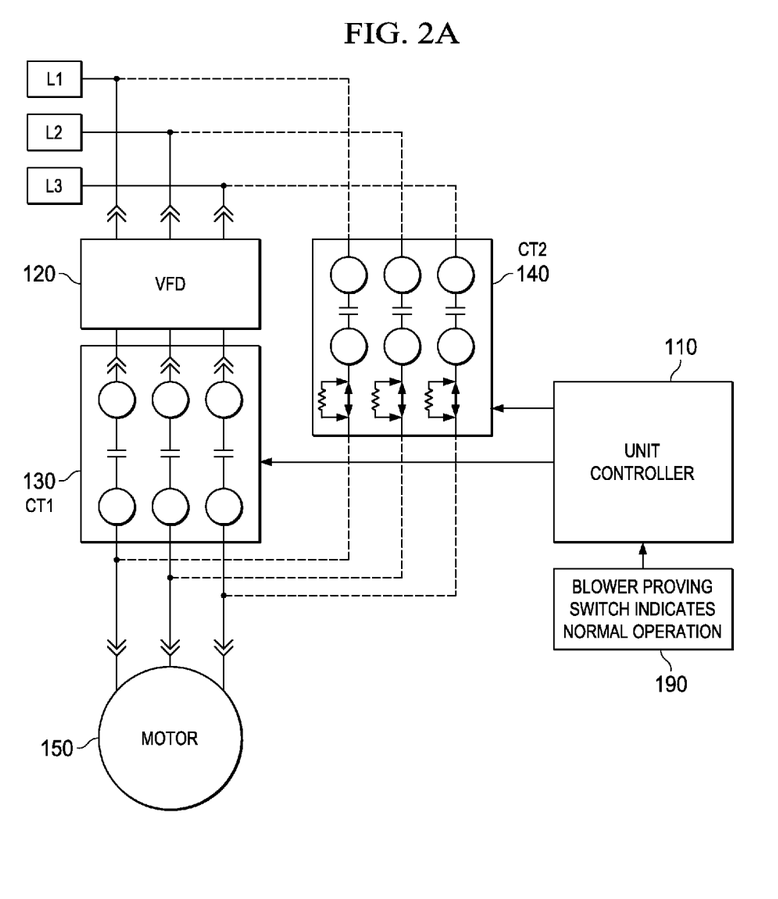
FIG. 2A illustrates the operation of the contactors 130, 140 of FIG. 1 when the BPS 190 indicates normal operation of the blower according to one embodiment of the disclosure.

FIG. 2A illustrates a configuration of the system 100 for the case that the BPS 190 indicates that the airflow is normal, e.g. greater than a predetermined value within the duct 180. The VFD 120 is connected to line voltage inputs, e.g. three-phase lines L1, L2 and L3. In this case the controller 110 closes the contactor 130 to provide a connection between the VFD 120 and the motor 150. The controller 110 opens the contactor 140 to isolate the motor 150 from a direct connection to L1, L2 and L3 as indicated by dashed lines between L1, L2 and L3 and the contactor 140, and between the contactor 140 and the motor 150.

Figure 2B:
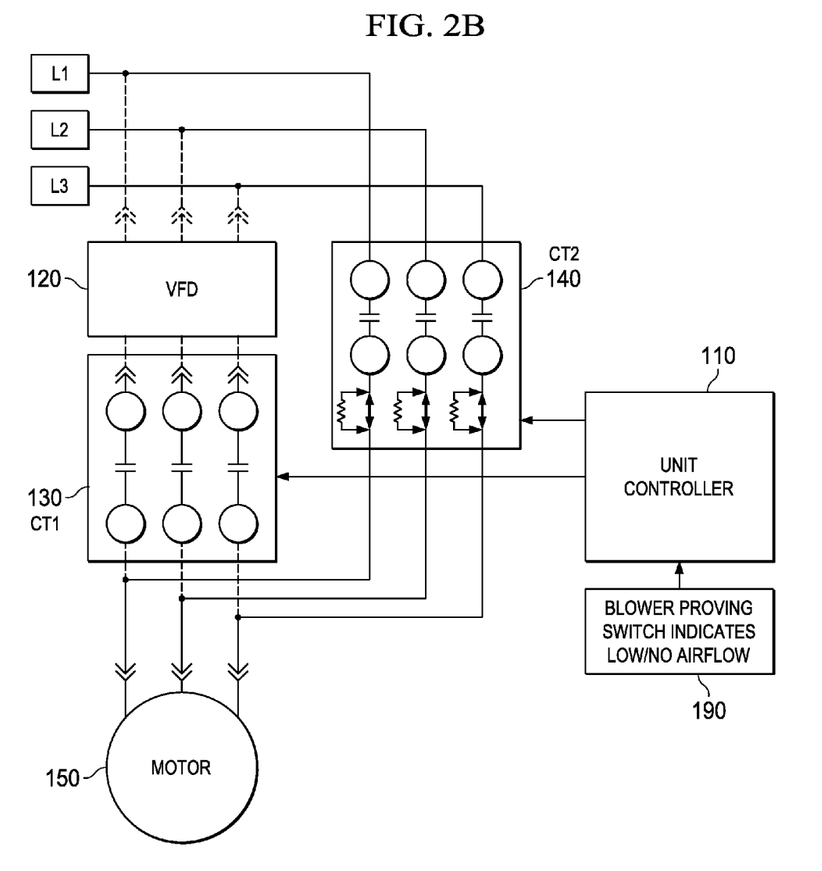
FIG. 2B illustrates the operation of the contactors 130, 140 of FIG. 1 when the BPS 190 indicates abnormal operation of the blower according to one embodiment of the disclosure.

FIG. 2B illustrates a configuration of the system 100 for the case that the BPS 190 indicates abnormal airflow within the duct 180, e.g. below the predetermined value. In this case the controller 110 actuates the contactor 140 to connect the motor 150 directly to L1, L2 and L3. The controller 110 actuates the contactor 130 to isolate the motor 150 from the VFD 120, as indicated by dashed lines between L1, L2 and L3 and the VFD 120, and between the contactor 130 and the motor 150.

Figure 3A:
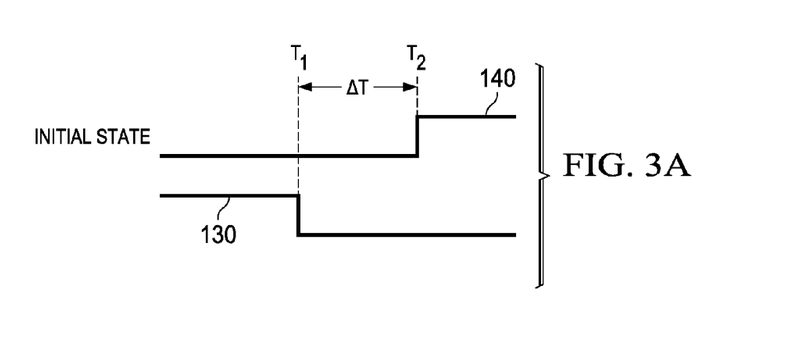
FIGS. 3A and 3B illustrate contactor control signals configured to prevent simultaneous connection of inputs and outputs of a variable speed motor drive to line voltage.
Figure 3B:
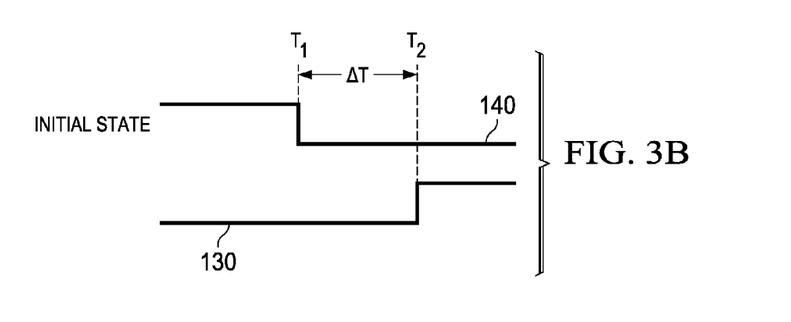

FIGS. 3A and 3B illustrate one embodiment timing of the control signals provided by the controller 110 and the contactors 130 and 140. In some cases it may be desirable to ensure that the VFD 120 output is not connected directly to the line power inputs L1, L2 and L3, e.g. to avoid damage to the VFD 120. In each of FIGS. 3A and 3B an upper trace is representative of control of the contactor 140 and a lower trace is representative of control of the contactor 130. In both traces a low value indicates the associated contactor 130 or 140 is open, while a high value indicates the contactor is closed.

FIG. 3A illustrates the case in which the motor 150 is initially powered via the VFD 120. FIG. The controller 110 actuates the contactor 130 at time $T_1$ to disconnect the motor 150 from the VFD 120. At a time $T_2$ the controller 110 actuates the contactor 140 to connect the motor 150 to the line voltage. The time $\Delta T = T_2 - T_1$ is not limited to any particular value, but may be selected to ensure the magnetic field associated with a solenoid within the contactor 130 has fully collapsed before actuating the contactor 140. In some embodiments a value of about 3 seconds is expected to be sufficient for this purpose.

FIG. 3B illustrates the case in which the motor 150 is initially directly powered by line power. The controller 110 actuates the contactor 140 at time $T_1$ to disconnect the motor 150 from the line voltage. At time $T_2$ the controller 110 actuates the contactor 130 to connect the motor 150 to the VFD 120. Again the time $\Delta T = T_2 - T_1$ may be a time that ensures the output of the VFD 120 is not connected to the line voltage, e.g. about 3 seconds.

Figure 4:
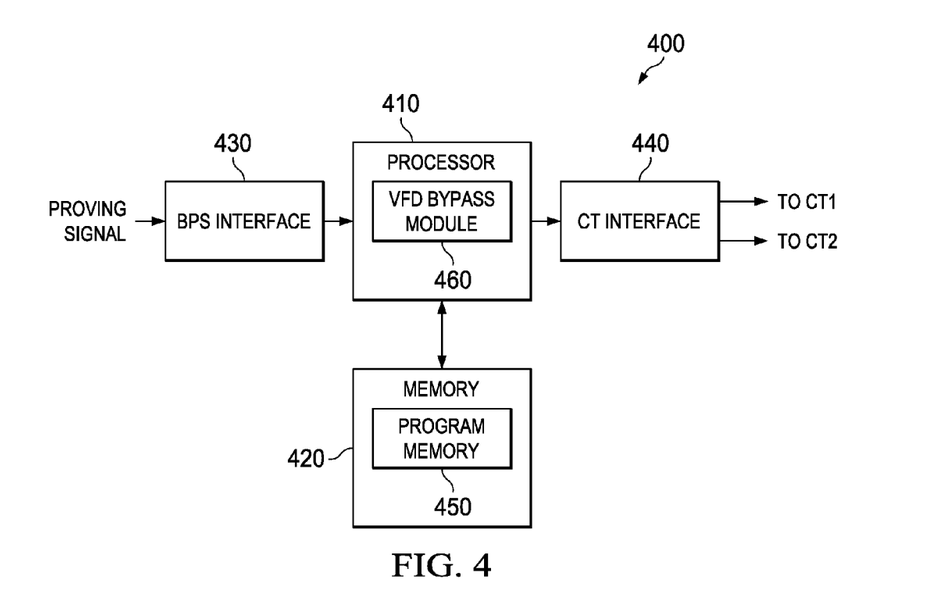
FIG. 4 illustrates an embodiment of the unit controller 110 configured to provide airflow various control functions provided by various embodiments.

FIG. 4 illustrates a controller 400 configured to provide the described control of the system 100 according to various embodiments of the disclosure. The controller 400 includes a processor 410, a memory 420, a BPS interface 430 and a contactor (CT) interface 440. Those skilled in the art will appreciate the division of functionality between these modules may be allocated in a different manner than described herein and remain within the scope of the invention.

The processor 410 may be any type of electronic controller, e.g. a general microprocessor or microcontroller, an ASIC device configured to implement controller functions, a state machine, etc. Similarly the memory 420 may be any type or memory, e.g. static random access memory (SRAM), dynamic random access memory (DRAM), programmable read-only memory (PROM), flash memory and the like. The BPS interface 430 may be any configuration of electronic devices configured to communicate with the BPS 190. Similarly, the CT interface 440 may be any configuration of electronic devices configured to communicate with the contactors 130 and 140.

The memory 420 provides program instructions to the processor 410 that guide overall operation of the system 100, including various conventional functions. The memory 420 also includes a program memory portion 450 that stores program instructions executed by the processor 410. More specifically, the program instructions encode a VFD bypass module 460, the operation of which is described below.

Figure 5:
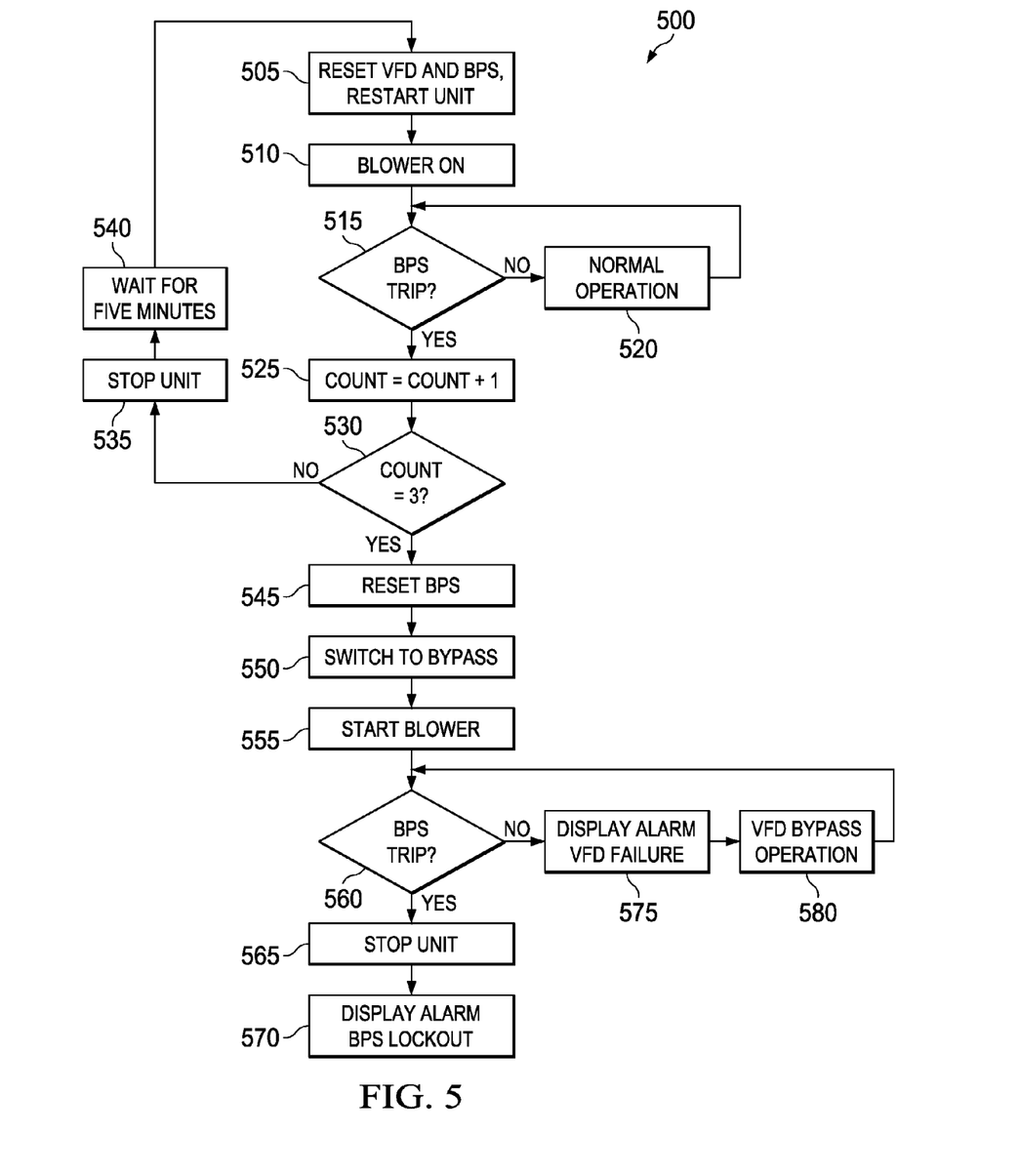
FIG. 5 illustrates a method of operating the system 100 of FIG. 1, e.g. implemented by the unit controller 110, according to one embodiment of the disclosure.

FIG. 5 illustrates an embodiment of a method 500 for controlling the operation of the system 100. In various embodiments the method 500 is implemented by the VFD bypass module 460. The method 500 is described with reference to the components of the system 100 without limitation thereto, and in particular may be executed by the controller 110.

The method 500 begins with a step 505 in which the controller 110 resets the VFD 120 and the BPS 190, and initiates a loop count described further below. The controller 110 may restart the system 100, such as by powering a compressor or starting a furnace in a sequence appropriate to the specific configuration of the system 100. In a step 510 the controller 110 powers the blower motor 150, thereby attempting to generate airflow within the duct 180. In a step 515 the controller 110 tests the output of the BPS 190. If the BPS 190 indicates normal airflow, the method 500 branches to a step 520 in which the system 100 operates normally. The method 500 loops between the steps 515 and 520 while the BPS 190 continues to indicate normal airflow.

If the BPS 190 trips, e.g. indicates that the airflow within the duct 180 is below a predetermined value, the method 500 proceeds to a step 525 and increments the previously initiated loop count. A step 530 tests to see if the loop count has reached a maximum value. This value may be a configurable parameter of the system 100, and is taken for illustration and without limitation as 3 for the current embodiment. This value may be set to any desired number. If the loop count has not reached the specified value the method 500 advances to a step 535 in which the controller 110 stops the system 100. In a step 540 the controller 110 waits for the expiration of a reset period to prevent short cycling of the HVAC components within the system 100, e.g. a compressor or furnace. The reset period may be any value as appropriate to the HVAC system design. As an illustrative and nonlimiting example a period of about 5 minutes may be sufficient to ensure that short cycling is prevented in a typical HVAC system. After the expiration of the reset period the method 500 advances to the step 505 to restart the system 100.

The loop count incremented in the step 525 may protect against nuisance failures, e.g. transient events that may result in reduced airflow. When the loop count has reached the configured maximum loop value, e.g. 3, the method 500 presumes that the failure is nontransient and advances to a step 545 to initiate remedial action.

In the step 545 the controller 110 resets the BPS 190. In a step 550 the controller 110 configures the contactors 130, 140 as previously described to connect the motor 150 to line power. In other words the contactors 130 and 140 are configured to bypass the VFD 120. In a step 555 the controller 110 attempts to start the motor 150 to power the blower 170. If in a step 560 the BPS 190 again trips, e.g. indicates inadequate airflow, the method 500 advances to a step 565 and stops the system 100. The method 500 presumes that low airflow after configuring the contactors 130 and 140 to bypass the VFD 120 indicates the presence of an uncorrectable failure, e.g. a broken belt or motor 150, debris, etc. On the other hand if the airflow is restored, failure is correctable by the bypass. Thus, the method 500 may discriminate between a failure of the motor 150 and the VFD 120.

In a step 570 the controller 110 locks out the system 100 and take action to alert a maintenance provider. The alert may include one or more of a visible alarm, an audible alarm, and an electronic message such as email or text message. The message may optionally include information on the nature of the failure.

If in the step 560 the BPS 190 has not tripped, the method 500 advances to a step 575. In the step 575 the controller 110 may take action to alert the maintenance provider, and provide an indication of the nature of the failure, e.g. activate an alarm. The method 500 then advances to a step 580 in which the system 100 operates in a bypass mode. The method 500 may continue to loop between the steps 560, 575 and 580 until the VFD failure is resolved, e.g. by a service provider. Bypass of the VFD 120 that results in restored airflow is a corrective action that provides continued service by the system 100 until the system 100 can be serviced. Notably, no direct signal from the VFD 120 to the controller 110 is needed. This aspect of embodiments of the invention provides broader protection from airflow failures that provided by some conventional systems that rely on reporting by the VFD. Moreover, VFDs may be used that do not provide such a signal, thereby making more such devices available for use in the system 100.

Figure 6:
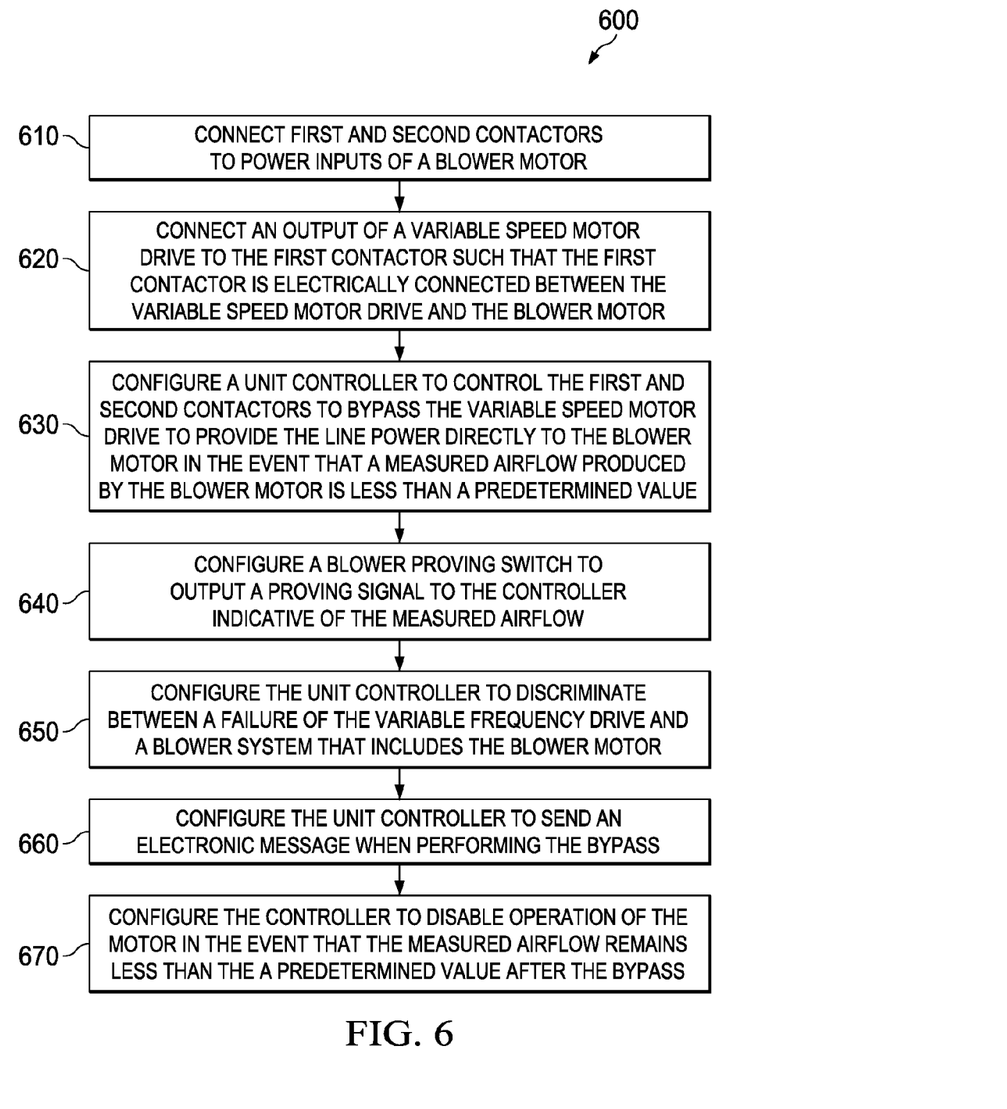
FIG. 6 provides a method of manufacturing an HVAC system, e.g. the system 100, according to various embodiments.

Turning now to FIG. 6, a method 600 is illustrated for manufacturing a system, e.g. an HVAC system. The method 600 is described without limitation in terms of the previously described features, e.g. in FIGS. 1-5. The steps of the method are presented in a nonlimiting order, and may be performed in another order or in some cases omitted.

In a step 610 first and second contactors, e.g. the contactors 130 and 140, are connected to power inputs of a blower motor, e.g. the blower motor 150. In a step 620 an output of a variable speed motor drive, e.g. the VFD 120, is connected to the first contactor such that the first contactor is electrically connected between the variable speed motor drive and the blower motor. In a step 630 a unit controller is configured to control the first and second contactors to bypass the variable speed motor drive to provide the line power directly to the blower motor in the event that a measured airflow is less than a predetermined value.

Embodiments of the method 600 may include a step 640 in which a blower-proving switch, e.g. the BPS 190, is configured to output an airflow-proving signal to the controller indicative of the airflow.

Any of the above embodiments of the method 600 may include a step 650 in which the unit controller is configured to discriminate between a failure of the blower motor and the variable speed motor drive.

Any of the above embodiments of the method 600 may include a step 660 in which the unit controller is configured to send an electronic message when performing the bypass.

Any of the above embodiments of the method 600 may include a step 670 in which the controller may be configured to disable operation of the motor in the event that the airflow remains less than the predetermined value after the bypass.

In any of the above embodiments of the method 600, the blower motor, variable speed motor drive and unit controller may be located in a rooftop unit.

Those skilled in the art to which this application relates will also appreciate that other and further additions, deletions, substitutions and modifications may be made to the described embodiments without departing from the scope of the description and the claims.

What is claimed is:

1. A heating, ventilation and air-conditioning system, comprising:
    a variable speed motor drive configured to receive line power and output modulated power;
    a blower motor configured to produce airflow in response to said modulated power;
    a unit controller configured to bypass said variable speed motor drive to provide said line power directly to said blower motor in the event that a measured airflow is less than a predetermined value; and
    a blower-proving switch configured to output an airflow-proving signal to said controller indicative of said measured airflow.

2. The system as recited in claim 1, wherein said unit controller is configured to discriminate between a failure of said variable speed motor drive and a blower system that includes said blower motor.

3. The system as recited in claim 1, wherein said unit controller is configured to send an automated message when performing said bypass.

4. The system as recited in claim 1, wherein said blower motor, variable speed motor drive and unit controller are located in a rooftop unit.

5. The system as recited in claim 1, wherein said controller is configured to disable operation of said motor in the event that said measured airflow remains less than said a predetermined value after said bypass.

6. The system as recited in claim 1, wherein said controller is further configured to perform said bypass after at least two successive cycles that include stopping operation of said HVAC system and waiting for the expiration of a reset period.

7. A heating, ventilating and air conditioning unit controller, comprising:
    a processor configured to execute program instructions stored by a program memory;
    a VFD bypass module defined by said program instructions, said bypass module being configured to control a contactor to bypass a variable speed motor drive in the event that said controller receives an airflow proving signal indicating airflow produced by a blower motor powered by said variable speed motor drive is less than a predetermined value;
    wherein said airflow proving signal is produced by a blower proving switch configured to sense said airflow.

8. The unit controller as recited in claim 7, wherein said VFD bypass module is configured to discriminate between a failure of said variable speed motor drive and a blower system that includes said blower motor.

9. The unit controller as recited in claim 7, wherein said VFD bypass module is configured to send an electronic message when performing said bypass.

10. The unit controller as recited in claim 7, wherein said processor is located in a rooftop unit.

11. The unit controller as recited in claim 7, wherein said VFD bypass module is configured to disable operation of said motor in the event that said airflow remains less than said a predetermined value after said bypass.

12. The unit controller as recited in claim 7, wherein said VFD bypass module is further configured to perform said bypass after at least two successive cycles that include stopping operation of said HVAC system and waiting for the expiration of a reset period.

13. A method of manufacturing a heating, ventilation and air-conditioning system, comprising:
    connecting first and second contactors to power inputs of a blower motor;
    connecting an output of a variable speed motor drive to said first contactor such that said first contactor is electrically connected between said variable speed motor drive and said blower motor;
    configuring a unit controller to control said first and second contactors to bypass said variable speed motor drive to provide said line power directly to said blower motor in the event that a measured airflow produced by said blower motor is less than a predetermined value; and
    configuring a blower motor proving switch to output an airflow proving signal to said controller indicative of said measured airflow.

14. The method as recited in claim 13, further comprising configuring a blower proving switch to output an airflow proving signal to said controller indicative of said measured airflow.

15. The method as recited in claim 13, further comprising configuring said unit controller to discriminate between a failure of said variable speed motor drive and a blower system that includes said blower motor.

16. The method as recited in claim 13, further comprising configuring said unit controller to send an electronic message when performing said bypass.

17. The method as recited in claim 13, wherein said blower motor, variable speed motor drive and unit controller are located in a rooftop unit.

18. The method as recited in claim 13, further comprising configuring said controller to disable operation of said motor in the event that said measured airflow remains less than said a predetermined value after said bypass.

* * * * *